Patented Aug. 17, 1948

2,447,465

UNITED STATES PATENT OFFICE 2,447,465

6-(ALPHA-ETHYLPROPYL)-2-THIOURACIL AND PREPARATION OF THE SAME

Wilbur H. Miller, Springdale, Conn., assignor to American Cyanamid Company, New York, N. Y., a corporation of Maine No Drawing. Application February 18, 1947, Serial No. 729,405

2 Claims. (Cl. 260—251)

This invention relates to new organic compounds and to methods of preparing the same. More particularly, the invention relates to 6-(alpha-ethylpropyl)-2-thiouracil, a new compound having unexpected antithyroid activity.

In the publication by myself and others, "Studies in Chemotherapy, X, Antithyroid Compounds," which appeared in the Journal of the American Chemical Society, 67, 2197, (1945), it is disclosed that thiouracil and certain 5- and 6- substituted thiouracils possess antithyroid activity in varying degrees. Using thiouracil itself as a base having a value of 1.0, it was found that the 6-alkyl substituted thiouracils increase in activity in the homologous series up to the n-propyl derivative, after which the activity falls off so that the 6-n-amyl-2-thiouracil has an antithyroid activity of only 1.3 and the 6-n-hexyl thiouracil has an activity of only 0.18. Despite this apparent falling off in activity with increased substitutions, I have made the surprising discovery that the specific compound 6-(alpha-ethylpropyl)-2-thiouracil can be prepared and has a much higher degree of activity than would be expected. At the present time it appears that this new compound is approximately 7 to 10 times as active as thiouracil itself or about 6 times as active as its isomer, the 6-n-amyl thiouracil. Because of the toxicity of thiouracil in some cases and the inactivity of other thiouracils in human patients, this is an important discovery.

The new 6-(alpha-ethylpropyl)-2-thiouracil may be prepared by reacting an ester of beta-oxo-gamma-ethyl caproate with thiourea in the presence of a strong alkali. A series of reactions from known compounds by which this new product is formed may be illustrated by the following equations in which R is an alkyl or other ester forming radical:

A specific example of each of the foregoing reactions is given hereinafter.

The reaction between thiouracil and beta-oxo-gamma-ethyl caproate is preferably conducted under substantially anhydrous conditions with the reactants dissolved or suspended in a solvent such as methyl alcohol, ethyl alcohol, dioxane, ethylene glycol, pyridine, or the like. The reaction requires a strong alkali such as an alkali metal alkoxide or hydroxide. The reaction is preferably conducted at the refluxing temperature of the solvent and will ordinarily require from about four to seven hours. At lower temperatures a longer period of time is required for best yields.

To illustrate the invention with greater exactness the following description is given in which the new product is prepared from known intermediates. It will be understood, of course, that variations in the details thereof may be made without departing from the essential features of the process.

Diethyl acetic acid (50 g. of 0.43 mol) and 46 cc. (0.63) mole thionyl chloride were mixed and heated on the steam bath under reflux for four hours. After standing overnight excess thionyl chloride was removed and the residue was distilled. 46.3 g. of diethylacetyl chloride, B. P. 138–142° C. at ordinary pressure, was obtained. This corresponds to a yield of 80%.

Magnesium ethoxide, 20 g. or 0.175 mole, was added to a 500 cc. round bottom 3-neck flask equipped with stirrer, reflux condenser, and dropping funnel. 100 cc. anhydrous ether was added followed by 30.4 g. (0.162 mole) ethyl tertiary butyl malonate. The mixture warmed up and most of the magnesium ethoxide went into solution. After 15 minutes' gentle heating, 23.2 g. (0.172 mole) diethylacetyl chloride in about 25 cc.

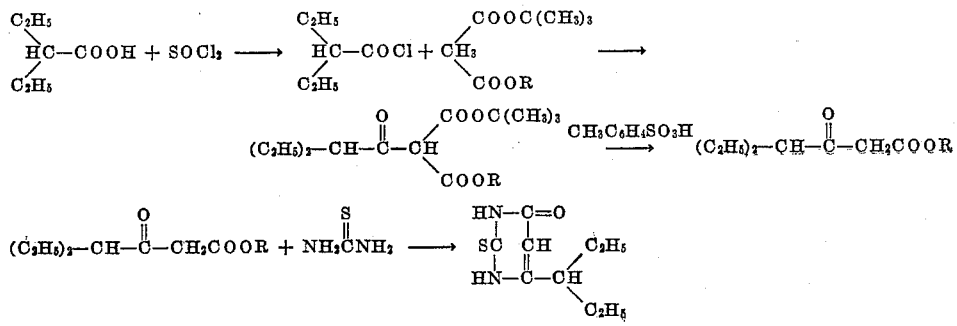

anhydrous ether was added during a five minute period and the mixture gently refluxed for an additional fifteen minutes. Water was added to the cooled mixture followed by dilute sulfuric acid (3:1) to a pH of 2. The organic layer was further extracted by ether and the combined ether solutions washed with water and dried over sodium sulfate.

The ether solution was concentrated and the residue treated with 100 cc. of benzene and 1 g. of p-toluene sulfonic acid. The solution was refluxed one and one-half hours with a water separator in the system. Gas was evolved during the heating. The cooled benzene solution was washed with saturated sodium bicarbonate solution and then water and dried over sodium sulfate. The benzene solution was concentrated and the residue distilled. By fractionation a 36.5% yield of product boiling 95–100° C. at 9 mm. was obtained. Analysis indicated this to be ethyl-beta-oxo-gamma-ethyl caproate, a new compound.

A second fraction boiling at 134–138° at 9 mm. was obtained. Analysis indicated this to be diethyl-alpha-ethylbutyryl malonate, a second new compound.

Sodium, 2.72 g. or 0.118 g. atom, was reacted in 50 cc. of absolute ethanol and 6.25 g. (0.082 mole) thiourea was dissolved in the solution by warming. 11 g. (0.056 mole) of ethyl-beta-oxo-gamma-ethyl caproate was added. The solution immediately became cloudy and a white precipitate settled out during the seven hours of heating. On cooling, this was filtered off. The solution was concentrated and a second fraction of precipitate obtained. These precipitates were easily soluble in water and the solution on acidification yielded only a small quantity of precipitate.

The alcoholic solution was next concentrated to dryness. The residue was dissolved in water and the solution acidified with hydrochloric acid to pH 2. The copious white precipitate was filtered off, washed on the filter funnel, and oven dried. A yield of crude product melting 215–17° equal of 45% of theory was obtained. This could be purified by recrystallization from water. The final M. P. of 6-(alpha-ethylpropyl)-2-thiouracil was 224.5–225°.

I claim:
1. 6-(alpha-ethylpropyl)-2-thiouracil.
2. A method which comprises mixing together ethyl-beta-oxo-gamma-ethyl caproate, thiourea, and an alkali metal alkoxide in a substantially anhydrous solvent and heating the mixture until 6-(alpha-ethylpropyl)-2-thiouracil is formed, and recovering the said product.

WILBUR H. MILLER.